US006366282B1

United States Patent
Trika

(10) Patent No.: US 6,366,282 B1
(45) Date of Patent: *Apr. 2, 2002

(54) METHOD AND APPARATUS FOR MORPHING OBJECTS BY SUBDIVIDING AND MAPPING PORTIONS OF THE OBJECTS

(75) Inventor: Sanjeev N. Trika, Hillsboro, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,533

(22) Filed: Sep. 8, 1998

(51) Int. Cl.[7] .............................................. G06T 17/20
(52) U.S. Cl. ........................ 345/423; 345/420; 345/425; 345/427; 345/429
(58) Field of Search ................................ 345/473, 433, 345/422, 420, 423, 425, 427, 429

(56) References Cited

U.S. PATENT DOCUMENTS

| | | |
|---|---|---|
| 5,448,686 A | 9/1995 | Borrell et al. |
| 5,590,251 A * | 12/1996 | Sclaroff et al. ............. 345/473 |
| 5,886,702 A | 3/1999 | Migdal et al. |
| 5,945,996 A * | 8/1999 | Migdal et al. .............. 345/420 |
| 5,963,209 A | 10/1999 | Hoppe |
| 5,966,140 A | 10/1999 | Popovic et al. |
| 5,969,722 A | 10/1999 | Palm |
| 5,990,901 A | 11/1999 | Lawton et al. |
| 6,009,435 A | 12/1999 | Taubin et al. |
| 6,031,548 A | 2/2000 | Gueziec et al. |
| 6,094,199 A | 7/2000 | Turkiyyah et al. |
| 6,147,692 A | 11/2000 | Shaw et al. |

OTHER PUBLICATIONS

Siggraph 97 Los Angeles, "Warping and Morphing of Graphical Objects", published 8/97.*
Goldstein, Eli and Gotsman, Craig. Polygon Morphing Using a Multiresolution Representation. Graphics Interface '95. pp. 247–254.
Sun, Yue Man, et al. Interpolating Polyhedral Models Using Intrinsic Shape Parameters. Proceedings of the Third Pacific Conference on Computer Graphics and Applications. Pacific Graphics '95. pp. 133–147.
Cohen–Or, Daniel , et al. ; "Three–Dimensional Distance Field Metamorphosis"; ACM Transactions on Graphics, vol. 17, No. 2, Apr. 1998, pp. 116–141.
Gregory, Arthur, et al.; "Feature–based Surface Decomposition for Correspondence and Morphing between Polyhedra"; Department of Computer Science, University of North Carolina at Chapel Hill.
Hughes, John F.; "Scheduled Fourier Volume Morphing"; Computer Graphics, 26.2. Jul. 1992; pp. 43–46.
Kaul, Anil, et al.; "Solid–Interpolating Deformations: Construction and animation of PIPs"; Proceedings of the European Computer Graphics Conference and Exhibition, Vienna, Austria Sep. 2–6, 1991; pp. 493–505.
Kent, James R., et al.; "Shape Transformation for Polyhedral Objects"; Computer Graphics, 26.2. Jul. 1992; pp. 47–54.

(List continued on next page.)

Primary Examiner—Mark Zimmerman
Assistant Examiner—Kimbinh T. Nguyen
(74) Attorney, Agent, or Firm—Blakely, Sokoloff, Taylor & Zafman LLP

(57) ABSTRACT

A method and apparatus for morphing between two objects is disclosed. In one embodiment, a first object and a second object are subdivided into pieces wherein said objects contain an equal number of pieces. With said pieces, a mapping between said first object's pieces and said second object's pieces is created. A morph sequence is then generated based on said mapping, vertices of said first object's pieces and corresponding vertices of said second object's pieces.

24 Claims, 4 Drawing Sheets

OTHER PUBLICATIONS

Lerios, Apostolos, et al.; "Feature–Based Volume Metamorphosis"; Computer Science Department; Stanford University.

Venkateraman, Kartik; Poston, Tim; "Piece–wise Linear Morphing and Rendering with 3D Textures"; Microprocessor Research Labs; Intel Corporation; Santa Clara, California; Centre for Information–enhanced Medicine; Institute for Systems Science; National University of Singapore; Singapore 119597.

Hoppe, Hugues; Progressive Meshes; Microsoft Research; hhoppe@microsoft.com;http://www.research.microsoft.com/research/graphics/hoppe; 8 pages.

Hopp, Hugues; View–Dependent Refinement of Progressive Meshes; Microsoft Research; hhoppe@microsoft.com; http://research.microsoft.com/~hoppe/; 10 pages.

Stein, Charles S.; Et Al.; The Multiresolution Dissolve: SMPTE Journal; Dec. 1988; pp. 977–982 and p. 984.

* cited by examiner

METHOD AND APPARATUS FOR MORPHING OBJECTS BY SUBDIVIDING AND MAPPING PORTIONS OF THE OBJECTS

FIELD OF THE INVENTION

This invention relates to computer graphics generally and particularly to systems with morphing capabilities between two N-dimensional objects.

RELATED APPLICATION

U.S. patent application "Method for Progressively Constructing Morphs", Sanjeev N. Trika, application Ser. No. 09/057,787, Apr. 8, 1998.

BACKGROUND OF THE INVENTION

Metamorphosis, or morphing, describes a process to change one object to another. A morph between two objects A and B is a time-varying object C(time), where object C(initial time) equals object A and object C(finished time) equals object B. As the time value for object C(time) increases from the initial time to the finished time, object C(time) will likely present the illusion that object A "morphs" into object B. Morphing between two or more objects over time is often a useful technique in education, entertainment and computer animation fields. Some example objects utilizing this morphing technique: an image, a polygon, a three-dimensional mesh or even an audio tone may all be morphed to another.

A typical morphing scheme between two images is that of optical cross-dissolving. In particular, this scheme fades out the original image while fading in the destination image. A user refines the resulting visual effect by specifying corresponding points between the two images. Such a morphing scheme requires much skill and tedious work to generate a visually appealing outcome.

Similar morphing approaches involving two polygons or two meshes have also been proposed. One such approach is disclosed in "Shape Transformation for Polyhedral Objects", by James R. Kent, et al., Computer Graphics, Vol. 26, No. 2, July, 1992 (herein as Kent, et al.). The approach describes a process which generates two new three5 dimensional (3-D) polyhedral models that have the same or similar shape as their input counterparts. At the same time, the process calculates the transformation from one newly generated model to another. However, this process not only assumes the morphing of a particular type of objects, but is also computationally intensive.

Another approach is discussed in "Feature-based Surface Decomposition for Correspondence and Morphing between Polyhedra", by Arthur Gregory, et al. (herein as Gregory, et al.) The method creates a morph between two 3-D objects based on a user's selected vertices between the two objects. Since this method maintains the combined topologies of the original objects, the method requires much calculation and particular vertex selection.

All the mentioned approaches possess at least one of the following drawbacks: 1) these schemes often require tedious user-interaction to specify the corresponding points between the two objects. 2) Because of the difficulty in establishing a desirable vertex correspondence between the two objects, these techniques frequently only operate on objects with particular geometric properties. 3) These approaches often require tremendous amount of computation cycles and thus are time consuming.

As has been demonstrated, an improved method and apparatus is needed to morph two objects speedily without having to unnecessarily place algorithmic constraints on the objects.

SUMMARY OF THE INVENTION

A method and apparatus for morphing between two objects is disclosed. In one embodiment, a first object and a second object are subdivided into pieces wherein the objects contain an equal number of pieces. With the generated pieces, a mapping between the first object's pieces and the second object's pieces is created. A morph sequence is then generated based on the mapping, vertices of the first object's pieces and corresponding vertices of the second object's pieces.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus for morphing between two objects is described. In the following description, numerous specific details are set forth such as cross-dissolve, linear interpolation, etc. in order to provide a thorough understanding of the present invention. However, it will be apparent to one of ordinary skill in the art that the invention may be practiced without these particular details. In other instances, well known elements and theories such as interpolation, pixel, polygons, meshes, polyhedra, etc. have not been discussed in special details in order to avoid unnecessarily obscuring the present invention.

As has been discussed previously, Kent et al. describes one morphing system which only applies to a particular type of objects only, or star-shaped objects. A star-shaped object is an object with at least one interior point p where any semi-infinite ray originating at p intersects the surface of the object at exactly one point.

Figure 1:
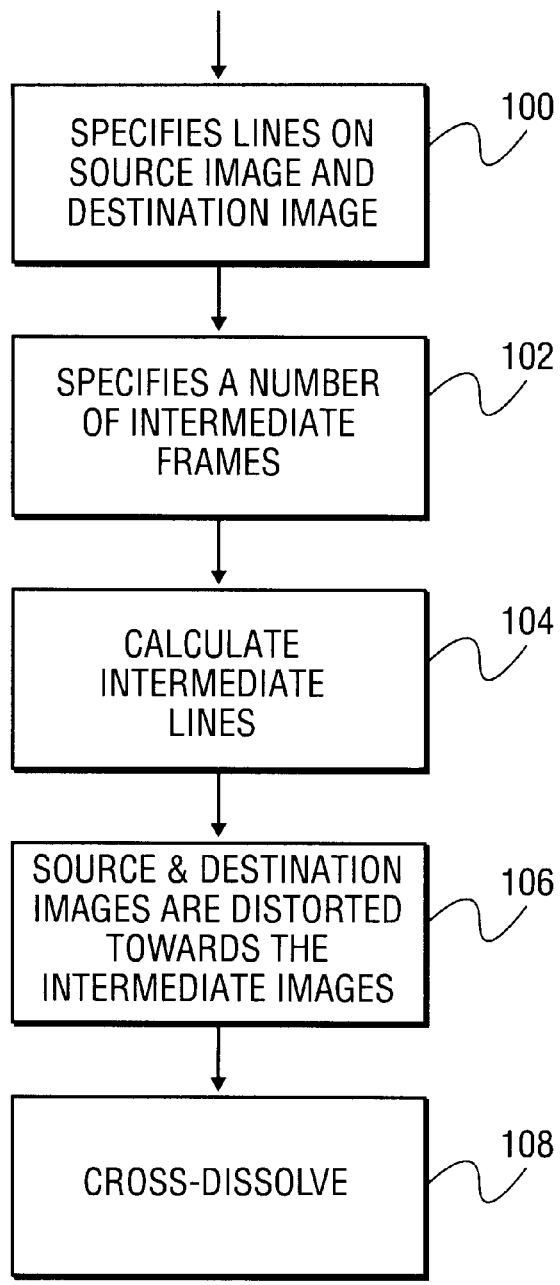
FIG. 1 illustrates a flow chart for a known morphing system between two objects.

Similarly, Gregory, et. al.'s morphing system also operates on specific types of objects, namely, three-dimensional polyhedra. FIG. 1 illustrates a flow chart of Gregory, et. al.'s morphing system. With a source polyhedron and a destination polyhedron as inputs, a user specifies vertex pairs on both polyhedra. The system then computes the shortest paths between such vertices in step 100. If the calculation of the paths proves to be impossible, the user-selected vertex pairs are not allowed. After having defined the acceptable shortest paths, the user proceeds to construct a feature net for each polyhedron, or a sub-graph of the vertex/edge connectivity graph, in step 102. It should be noted that a user needs to specify a sufficient number of vertices in order to partition the polygons' boundaries. Based on the user-defined feature net, the morphing system in step 104 decomposes the corresponding surface of the polyhedron into a morphing patch, where the patch is a connected subset of a polyhedron which can be mapped to a two dimensional (2-D) polygon. However, this decomposition algorithm only applies to morphing patches which are bounded by a single loop of adjacent vertices.

In step 106, the morphing patches are mapped to a 2-D polygon. The topological connectivity of these patches are merged into the 2-D polygon in step 107. In other words, step 106 and step 107 ensure that geometric and connective features of the input polygons are maintained after the mapping and the merging processes occur. Using the results from step 107, step 108 reconstructs the surfaces for the new morphing patch and generates a merged polygon with the combined topologies of the input polygons. Lastly, this known system shown in FIG. 1 provides users an interface in step 109 to further redefine the vertices, recalculate the shortest paths and the feature net in some part of the polyhedra, and thus refine the morphed results.

These prior art morphing systems have several shortcomings. Firstly, a user must initially define the vertex pairs before the morphing process can begin. In addition, as has been discussed previously, these pairs must also satisfy some mathematical requirements. Secondly, due to the various steps of calculations, mapping and merging, the entire morphing process is likely to be slow. Thirdly, these known systems can only operate on objects with particular algorithmic limitations. As has been mentioned previously, Kent, et al.'s system only operates on star-shaped objects. Gregory, et al.'s system only operates on 3-D polyhedra, where the morphing patches in step 104 must be bounded by a single loop of adjacent vertices.

Figure 2:
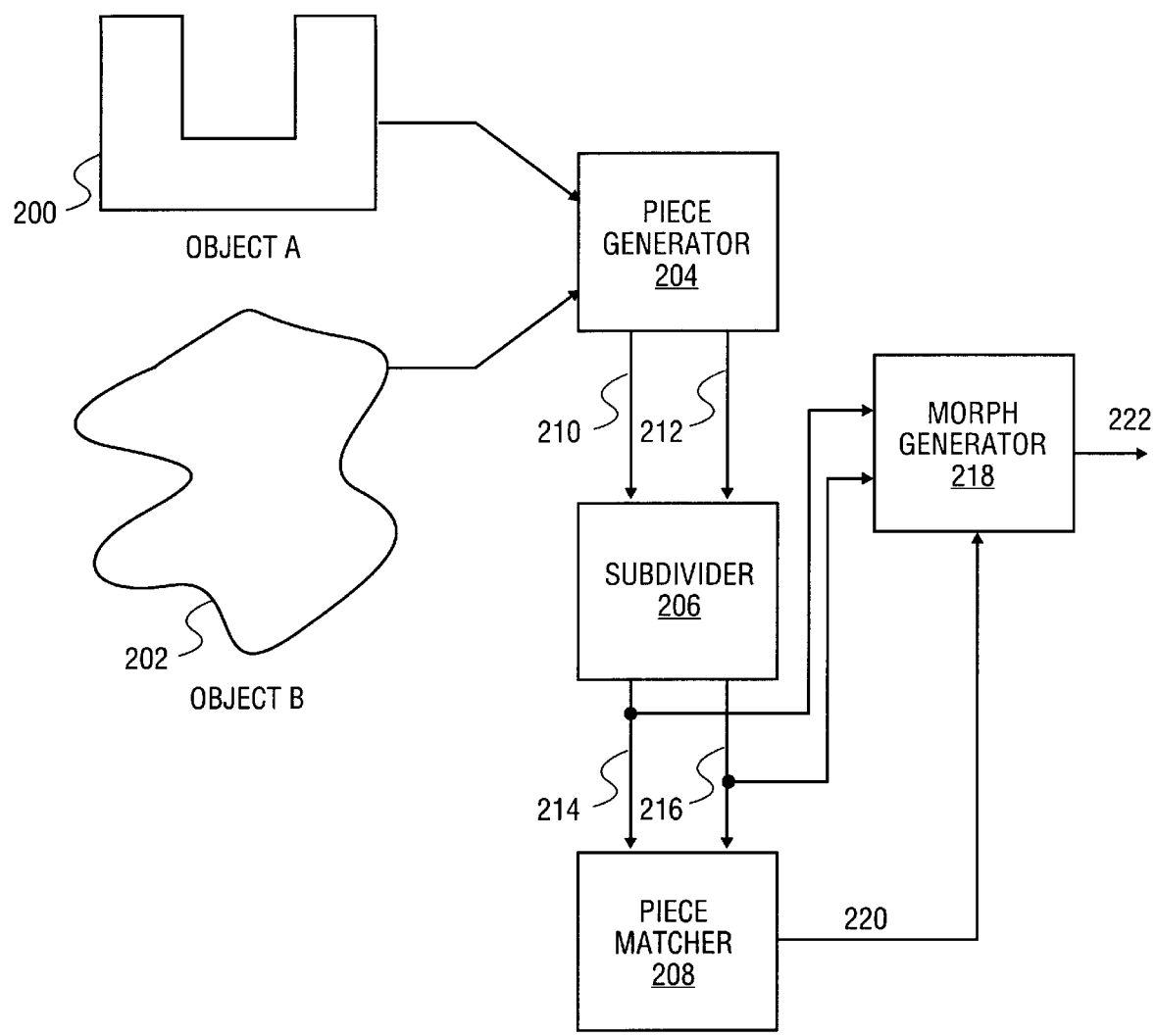
FIG. 2 illustrates the block diagram of one embodiment of the present invention.
Figure 3:
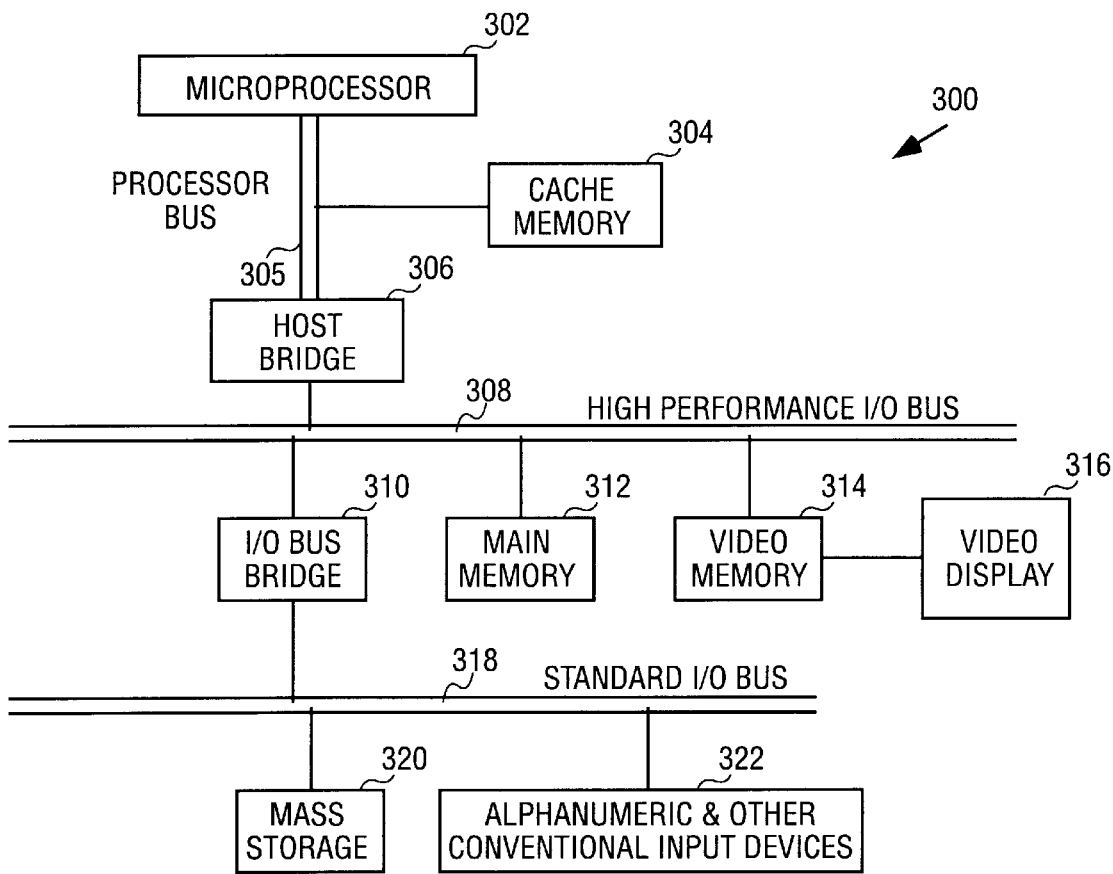
FIG. 3 illustrates a general purpose computer system architecture.

FIG. 2 illustrates the block diagram of one embodiment of the present invention which addresses the mentioned flaws. The block diagram can be programmed or implemented in various types of systems. One such system is illustrated on a general purpose computer system 300 in FIG. 3. Such a computer system architecture comprises microprocessor 302 and cache memory 304 coupled to each other through processor bus 305. Sample computer system 300 also includes high performance I/O bus 308 and standard I/O bus 318. Processor bus 305 and high performance I/O bus 308 are bridged by host bridge 306, whereas high performance I/O bus 308 standard I/O bus 318 are bridged by I/O bus bridge 310. Coupled to high performance I/O bus 308 are main memory 312 and video memory 314. Coupled to video memory 314 is video display 316. Coupled to standard I/O bus 318 are mass storage 320, and alphanumeric input device or other conventional input device 322.

These elements perform their conventional functions well known in the art. In particular, mass storage 320 may be used to provide permanent storage for the executable instructions for an embodiment of the present invention, whereas main memory 312 may be used to temporarily store the executable instructions of an embodiment of the present invention during execution by CPU 302.

Operation of the Present Invention

The invention at hand is a method and apparatus for morphing between two objects. Specifically, the present invention morphs between two objects in a speedy fashion without imposing any algorithmic assumptions on the objects.

One embodiment of the invention consists of various components as illustrated in FIG. 2 operating on a general purpose computer system. The embodiment also uses two meshes, Object A 200 and Object B 202 represented here as particular shapes, to demonstrate the invention. It will be apparent to those of ordinary skill in the art that Object A and Object B may be any arbitrary shape. Object A 200 and Object B 202 are inputs to piece generator 204. Piece generator produces triangles$_{Object\ A}$ 210 and triangles$_{Object\ B}$ 212 and sends them to subdivider 206. Based on the number of triangles received, subdivider 206 may proceed to further subdivide the incoming triangles$_{Object\ A}$ 210 or triangles$_{Object\ B}$ 212 and manage the resulting triangles' vertices. After subdivided-triangles$_{Object\ A}$ 214 and subdivided-triangles$_{Object\ B}$ 216 are generated and sent to piece matcher 208, piece matcher 208 randomly generates mapping 220 between the two different sets of triangles and transmits the resulting mapping 220 to morph generator 218. Based on vertices of subdivided-triangles$_{Object\ A}$ 214, subdivided-triangles$_{Object\ B}$ 216 and triangle mapping 220, morph generator 218 then produces the in-between transformed meshes 222.

It should be noted that although a specific type of object, i.e. a mesh, is used to describe one embodiment of the present invention, the invention may apply to other types of objects without exceeding the scope of the invention. For example, instead of being meshes, Object A 200 and Object B 202 can be polygons. Instead of generating equal number of triangles, piece generator 204 and subdivider 206 generate an equal number of edges for polygon 200 and polygon 202. More specifically, depending on which polygon has fewer edges, subdivider 206 receives the generated edges from piece generator 204 and splits these edges randomly until the number of edges in polygon 200 equals to the number in polygon 202.

Furthermore, it should be apparent to one ordinarily skilled in the art to separate or combine certain functionality of each illustrated component in FIG. 2. For instance, the functionality of subdivider 206 can be incorporated in piece generator 204 or vice versa without departing from the spirit of the present invention.

Figure 4:
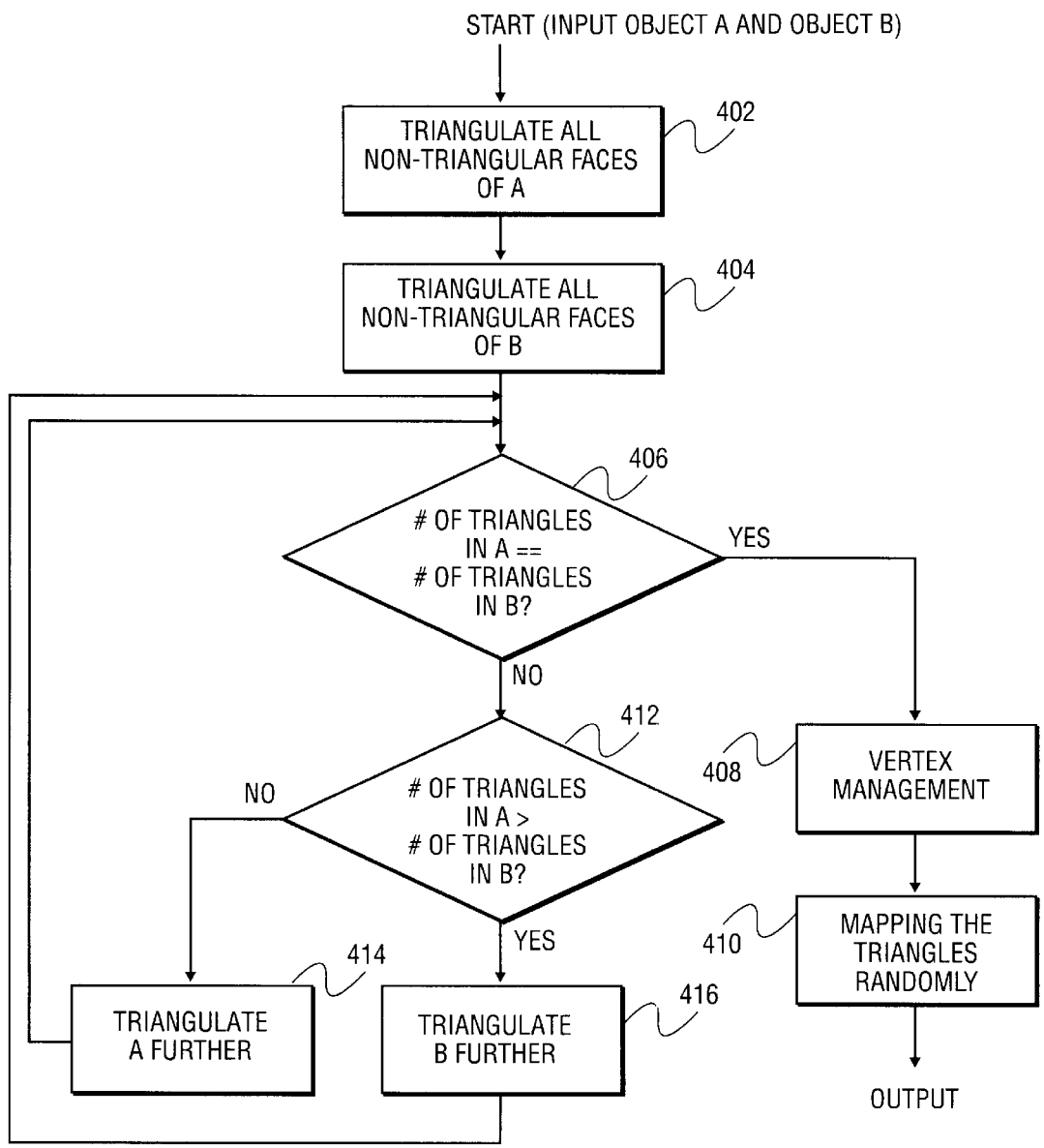
FIG. 4 illustrates a flow chart for one embodiment of the present invention.

The operations of the illustrative system in FIG. 2 can be characterized in three phases: piece generation phase, match phase, and morph generation phase. In one embodiment of the present invention, in the piece generation phase or phase 1, triangular generator 204 takes various inputs such as object A 200 and object B 202 and splits the mesh objects into triangles. FIG. 4 illustrates a flow chart detailing the piece generation process.

In step 402 and 404, piece generator 204 identifies all non-triangular faces of object A 200 and object B 202 and triangulates those identified faces. After having generated the triangles, subdivider 206 in step 406 compares the number of triangles in object A 200 with the number of triangles in object B 202. When the outcome of the comparison in 406 is equal, subdivider 206 verifies the vertices of the triangles in step 408; namely, for every vertex that is shared by multiple faces of the objects, an additional vertex is reproduced at the same location. This vertex management step is necessary to ensure the splitting apart of all triangles during the morphing process. Then, piece matcher 208 randomly maps the triangles with these newly arranged vertices in one object to the vertices in another object in step 410. The results of the mapping are retained and transmitted to morph generator 218.

Nevertheless, when the number of triangles generated for object A 200 and object B 202 are not equal, in one embodiment of the present invention, step 412 is used to compare the number of triangles in object A 200 with the number in object B 202. Depending on the outcome of step 412, either subdivider 206 subdivides the triangles from object A 202 further in step 414 or subdivides the triangles from object B 204 further in step 416. This iterative process of comparing and subdividing triangles continues until the number of triangles in object A 200 equals to the number of triangles in object B 202 in step 406.

It should be noted that other implementations of the present invention can yield the same result without exceeding the scope of the present invention. For instance, step 412 can execute prior to step 406. Then after the completion of steps 414 and 416, step 406 executes. When the new step 406 indicates that the numbers are not equal, the new step 412 executes. Otherwise, the operation of the present invention continues on through steps 408 and 410.

In the match phase or phase 2, one embodiment is to create a mapping function, or mapping 214, between subdivided triangles from object A 200 and object B 202. The following lines of pseudo code illustrate one mapping algorithm:

Step 2.1: Let ntA=number of subdivided triangles in A

Step 2.2: Let Map=an array with ntA elements, for example

Step 2.3: For I=1 to ntA Map[I]=I

Step 2.4: Randomize Map.

Thus, when ntA is 500, then the Map array has the following values: Map[1]=1, Map [2]=2, . . . , Map [500]=500. After step 2.4 is executed and the Map array is randomized, Map [1] may contain 342, and Map [500] may contain 124. In other words, triangle 1 in A is mapped to triangle 342 in B, or vice versa. Since this described mapping process from step 2.1 to step 2.4 is performed after object A 200 and object B 200 have reached the identical number of triangles in one implementation of the present invention, every triangle in object A 200 is ensured to correspond to a triangle in object B 202.

After mapping 214 has been established and sent to morph generator 218, the morphing process then enters the morph generation phase or phase 3. Again using the following lines of pseudo code as an illustration, a morph sequence or the in-between transformed objects are generated.

Step 3.1: Set Output to be subdivided triangles of A

Step 3.2: Let ntA=number of subdivided triangles in A

Step 3.3: For I=1 to ntA

Step 3.4: For J=1 to 3

Step 3.5: Let vA=vertex J of subdivided triangle I of A

Step 3.6: Let vB=vertex J of subdivided triangle Map[I] of B

Step 3.7: Let v=(1−t)*vA+t*vB, where t is the current time

Step 3.8: Set vertex J of triangle I of Output 222 to v, where Output 222 is the output of morph generator 218

In the embodiment described in the above steps 3.1 to 3.8, every vertex of each triangle in A and its corresponding vertex of each triangle in B are linearly interpolated to create each vertex of the output. For example, assuming I is 23 and Map[23] is 323, the location of vertex 1 from A's triangle 23 and vertex 1 from B's triangle 323 are manipulated based on the equation in step 3.7 to determine the location of one vertex of the output. The similar process continues until all of the vertices in A and B have been interpolated.

It should be emphasized that various known interpolation schemes can be used. Thus, different equations can apply to the present invention in step 3.7 without departing from the spirit of the invention. It should be further noted that any interpolation parameters in step 3.7 can either be a predetermined and fixed value or a user-defined value.

It should further be emphasized that the described embodiment of the present invention generates appealing morph sequences without requiring any user interaction. On the other hand, the invention does not deprive users the option of fine tuning the morph output. For example, the invention can incorporate some user-interface where a user is permitted to modify appropriate interpolation parameters in step 3.7 or other suitable parameters in other described steps. The user may also specify portions of mesh A and mesh B that must be morphed to each other in piece matcher 208.

Finally, although the present invention has been described in details with respect to an object's spatial attribute, applying the invention to other attributes of an object, such as color, texture, texture-coordinate, material, etc. will be apparent to those skilled in the art. Using color as an illustration, during the discussed morph generation phase or phase 3, in addition to linearly interpolating between the corresponding spatial coordinates of subdivided triangles' vertices, morph generator 218 can also interpolate the color values between those vertices. As a result, the color setting in a piece of object A gradually transition to the setting in the corresponding piece in object B.

Thus, a method and apparatus for morphing between two objects has been disclosed. Although the present invention has been described particularly with reference to the figures, it will be apparent to one of the ordinary skill in the art that the present invention may appear in any number of systems which provide morphing functionality. It is further contemplated that many changes and modifications may be made by one of ordinary skill in the art without departing from the spirit and scope of the present invention.

What is claimed is:

1. A method of morphing a first object with a second object, the method comprising:

a. randomly dividing non-triangular sides of said first object into a first number of first pieces and randomly dividing non-triangular sides of said second object into a second number of second pieces;

b. based on values of said first number and said second number, randomly subdividing said first pieces and said second pieces until number of said subdivided first pieces equals to number of said subdivided second pieces;

c. duplicating first vertices that are shared by said subdivided first pieces and duplicating second vertices that are shared by said subdivided second pieces;

d. randomly associating said subdivided first pieces to said subdivided second pieces to create a mapping; and e. generating a morph sequence based on said mapping, vertices of said subdivided first pieces, said duplicated first vertices, corresponding vertices of said subdivided second pieces, and said duplicated second vertices.

2. The method according to claim 1, wherein said first and said second objects can be two-dimensional or three-dimensional polygons or meshes with divisible faces or edges.

3. The method according to claim 2, wherein said first and said second pieces can be triangles or edges.

4. The method according to claim 1, further comprises:

linearly interpolating between said vertices from said first pieces and said corresponding vertices from said second pieces.

5. The method according to claim 4, further comprises:

linearly interpolating between at least one of color attributes, texture attribute, material attribute or spatial attribute of said first object and said second object.

6. An apparatus for morphing a first object with a second object, the apparatus comprising:

a. means for randomly subdividing said first object into a number of first pieces and said second object into a number of second pieces, wherein the number of said first pieces equals to the number of said second pieces;

b. means for duplicating first vertices that are shared by said first pieces and duplicating second vertices that are shared by said second pieces;

c. means for randomly associating said first pieces to said second pieces to generate a mapping;

d. means for generating a morph sequence based on said mapping, vertices of said first pieces, said duplicated first vertices, corresponding vertices of said second pieces and said duplicated second vertices.

7. The apparatus according to claim 6, wherein said first and said second objects can be two-dimensional or three-dimensional polygons or meshes with divisible faces or edges.

8. The apparatus according to claim 7, wherein said first and said second pieces can be triangles or edges.

9. The apparatus according to claim 8, wherein said subdividing means generates said first and said second pieces by subdividing said first and said second objects' faces.

10. The apparatus according to claim 6, wherein means for generating a morph sequence further comprises:

means for linearly interpolating between said vertices from said first pieces and said corresponding vertices from said second pieces.

11. The apparatus according to claim 10, wherein means for linearly interpolating is performed on at least one of color attributes, texture attribute, material attribute or spatial attribute of said first object and said second object.

12. An apparatus for morphing a first object with a second object, the apparatus comprising:

a. a piece generator to randomly divide non-triangular sides of said first object into a first number of first pieces and randomly divide non-triangular sides of said second object into a second number of second pieces;

b. a subdivider, coupled to said piece generator, based on values of said first number and said second number to randomly subdivide said first pieces and said second pieces until number of said subdivided first pieces equals to number of said subdivided second pieces;

c. a piece matcher, coupled to said subdivider, to map said subdivided first pieces to said subdivided second pieces; and d. a morph generator, coupled to said subdivider and said piece matcher, to generate a morph sequence based on outcome of said mapping, vertices of said first pieces and corresponding vertices of said second pieces.

13. The apparatus according to claim 12, wherein said first and said second objects can be two-dimensional or three-dimensional objects with divisible faces or edges.

14. The apparatus according to claim 13, wherein said first and said second pieces can be triangles or edges.

15. The apparatus according to claim 14, wherein said piece generator generates said first and said second pieces by subdividing said first and said second objects' faces.

16. The apparatus according to claim 15, wherein said morph generator further comprises:

a vertex manager to identify shared vertices between said first and said second objects' divisible faces and to generate additional vertices in the same positions as said identified shared vertices.

17. The apparatus according to claim 12, wherein said piece matcher randomly associates said first pieces with said second pieces.

18. The apparatus according to claim 12, wherein said morph generator further comprises:

an interpolator to linearly interpolate between said vertices from said first pieces and said corresponding vertices from said second pieces.

19. The apparatus according to claim 18, wherein said interpolator linearly interpolates at one of color attribute, texture attribute, material attribute or spatial attribute of said first object and said second object.

20. A machine readable medium including a plurality of instructions readable therefrom, said instructions, when executed by a machine, cause said machine to morph a first object to a second object, comprising:

a. randomly dividing non-triangular sides of said first object into a first number of first pieces and randomly dividing non-triangular sides of said second object into a second number of second pieces;

b. based on values of said first number and said second number, randomly subdividing said first pieces and said second pieces until number of said subdivided first pieces equals to number of said subdivided second pieces;

c. duplicating first vertices that are shared by said subdivided first pieces and duplicating second vertices that are shared by said subdivided second pieces;

d. randomly associating said subdivided first pieces to said subdivided second pieces to create a mapping; and e. generating a morph sequence based on said mapping, vertices of said subdivided first pieces, said duplicated first vertices, corresponding vertices of said subdivided second pieces, and said duplicated second vertices.

21. The machine readable medium according to claim 20, wherein said first and said second objects can be two-dimensional or three-dimensional objects with divisible faces or edges.

22. The machine readable medium according to claim 21, wherein said first and said second pieces can be triangles or edges.

23. The machine readable medium according to claim 20, wherein said instructions further comprises:

linearly interpolating between said vertices from said first pieces and said corresponding vertices from said second pieces.

24. The machine readable medium according claim 23, wherein said instructions further comprises linearly interpolating between at least one of color attributes, texture attribute, material attribute or spatial attribute of said first object and said second object.

* * * * *

UNITED STATES PATENT AND TRADEMARK OFFICE
CERTIFICATE OF CORRECTION

PATENT NO. : 6,366,282 B1
DATED : April 2, 2002
INVENTOR(S) : Trika

It is certified that error appears in the above-identified patent and that said Letters Patent is hereby corrected as shown below:

<u>Column 1,</u>
Line 44, delete "three5 dimensional", insert -- three-dimensional --.

Signed and Sealed this

Twenty-seventh Day of August, 2002

Attest:

JAMES E. ROGAN
Attesting Officer     Director of the United States Patent and Trademark Office